US 6,738,390 B1

United States Patent
Xu et al.

(10) Patent No.: US 6,738,390 B1
(45) Date of Patent: May 18, 2004

(54) SIP-H.323 GATEWAY IMPLEMENTATION TO INTEGRATE SIP AGENTS INTO THE H.323 SYSTEM

(75) Inventors: Xinzhong Leon Xu, San Jose, CA (US); Mark Skrzynski, Capitola, CA (US); Paul Mayer, Mountain View, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/541,303

(22) Filed: Apr. 3, 2000

(51) Int. Cl.[7] .............................................. H04L 12/56
(52) U.S. Cl. ...................................................... 370/467
(58) Field of Search ................................. 370/466, 467, 370/352, 353, 401, 402, 468

(56) References Cited

U.S. PATENT DOCUMENTS

| | | | | |
|---|---|---|---|---|
| 6,366,577 B1 | * | 4/2002 | Donovan ..................... 370/352 |
| 6,446,127 B1 | * | 9/2002 | Schuster et al. ............ 709/227 |
| 6,490,275 B1 | * | 12/2002 | Sengodan .................... 370/356 |
| 6,512,818 B1 | * | 1/2003 | Donovan et al. ......... 379/88.18 |
| 6,529,499 B1 | * | 3/2003 | Doshi et al. ................. 370/352 |
| 6,584,093 B1 | * | 6/2003 | Salama et al. .............. 370/351 |
| 6,584,186 B1 | * | 6/2003 | Aravamudan et al. . 379/201.03 |

FOREIGN PATENT DOCUMENTS

EP  0 967 764 A2  12/1999

OTHER PUBLICATIONS

US 2001/0046234, Nov. 2001, Agrawal et al. 370/402.*
US2002/0126626, Sep. 2002, Singh et al., 370/260.*
Singh/Schulzrinne, Interworking Between SIP/SDP and H.323, Internet Engineering Task Force, Internet Draft, Jan. 10, 2000, XP–002246035, 46 pgs.
Tsuhan Chen, Video Coding and Multimedia Communications Standards for Internet, IEEE 1998, 4 pgs.
L–P. Anquetil, J. Bouwen, A. Conte, B. Van Doorselaer, Media Gateway Control Protocol and Voice Over IP Gateways, Alcatel Telecommunications Review—2nd Qtr 1999, XP–000830045, 7 pgs.
James Toga, Jörg Ott, ITU–T standardization activities for interactive multimedia communications on packet–based networks: H. 323 and related recommendations, Computer Networks 31 (1999), XP–000700319, 19 pgs.

* cited by examiner

*Primary Examiner*—Kenneth Vanderpuye

(57) ABSTRACT

An SIP-H.323 gateway (210) is provided, which functions as a multi-alias H.323 endpoint (204) with one alias representing one SIP agent (206). The SIP-H.323 gateway (210) processes the call signaling conversions and stores and passes media port information to the signaling parties, so that the existence of SIP agents (206) is transparent to the H.323 endpoints (204) and the features are transparently available to the H.323 endpoints.

22 Claims, 5 Drawing Sheets

A SIP-H.323 System

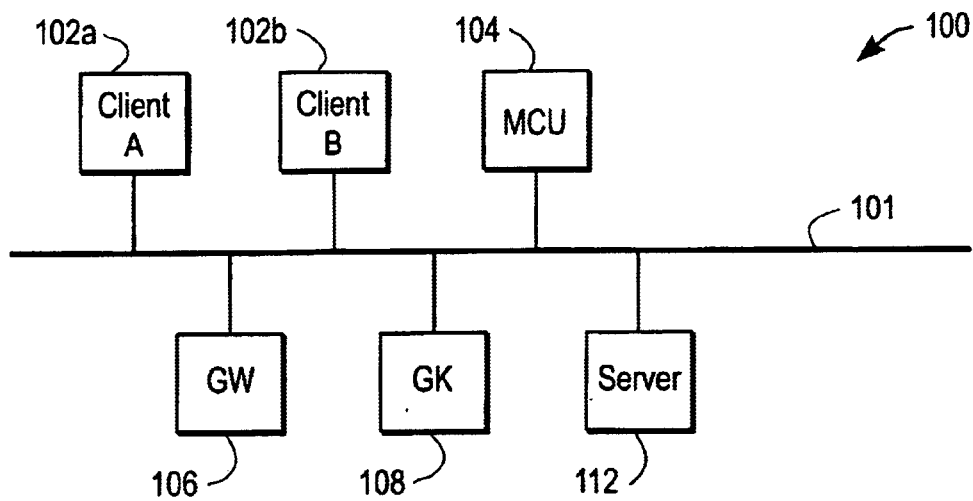
FIG. 1 (Prior Art)
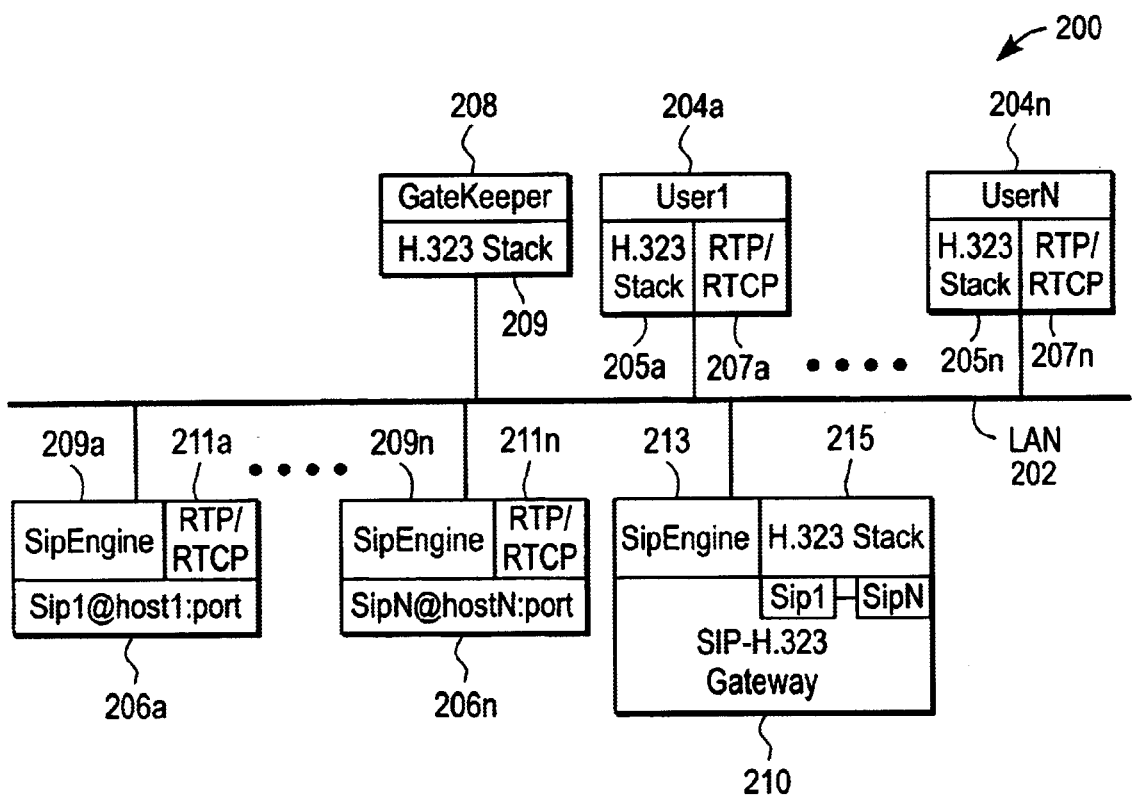
FIG. 2  A SIP-H.323 System

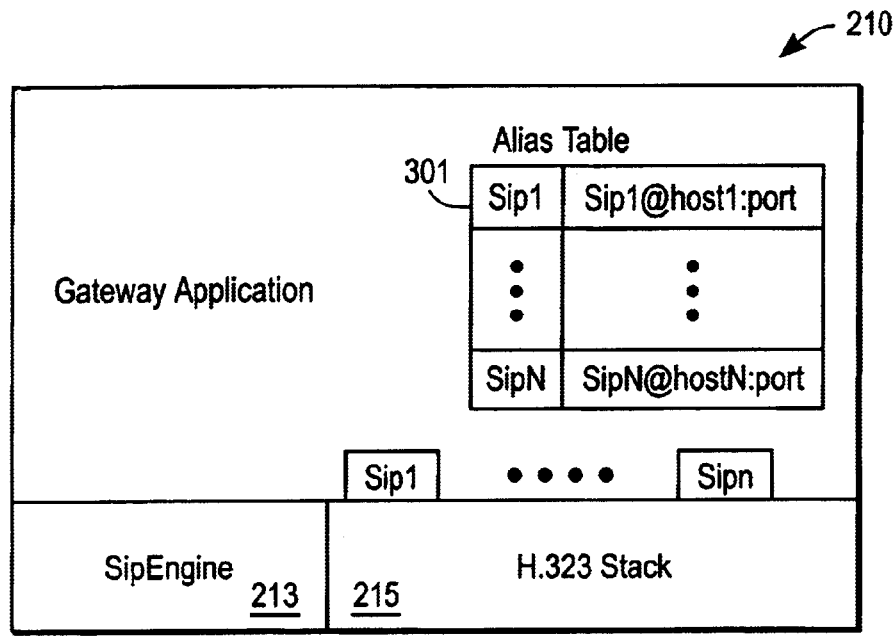
FIG. 3
The SIP-H.323 Gateway Architecture
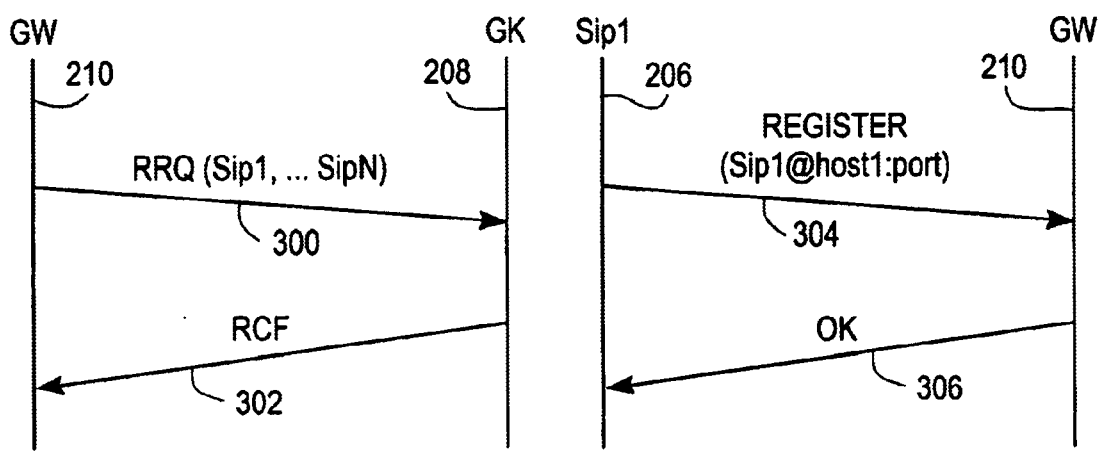
FIG. 4
Gateway Registers all the SIP Agent aliases to the GK
FIG. 5
SIP Agent register to the GW

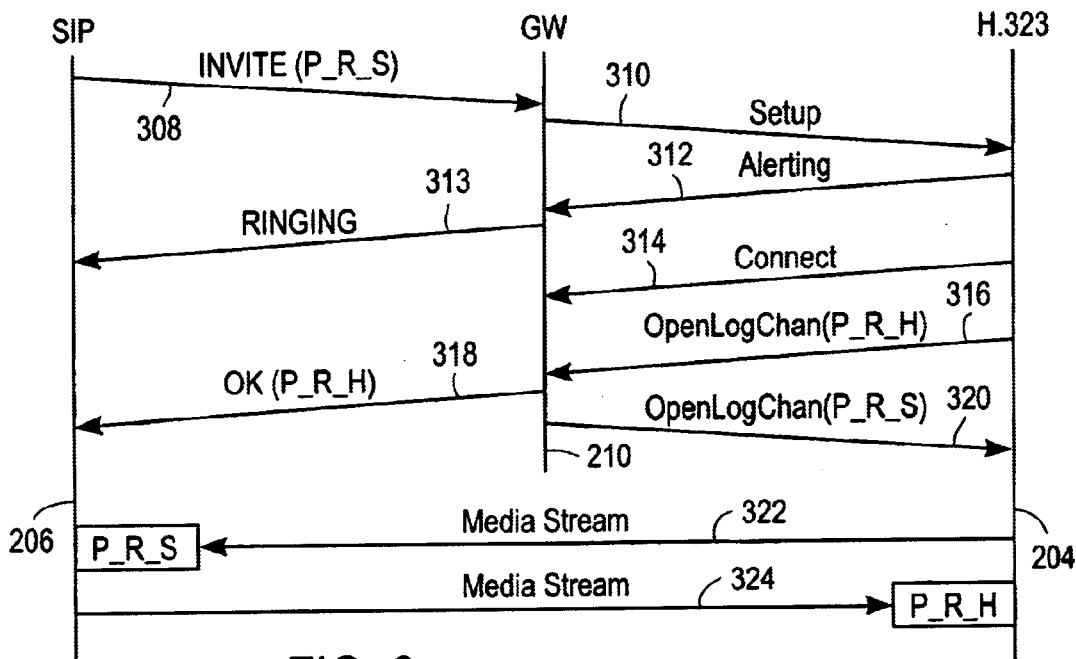
FIG. 6  A SIP Agent calls H.323 Endpoint
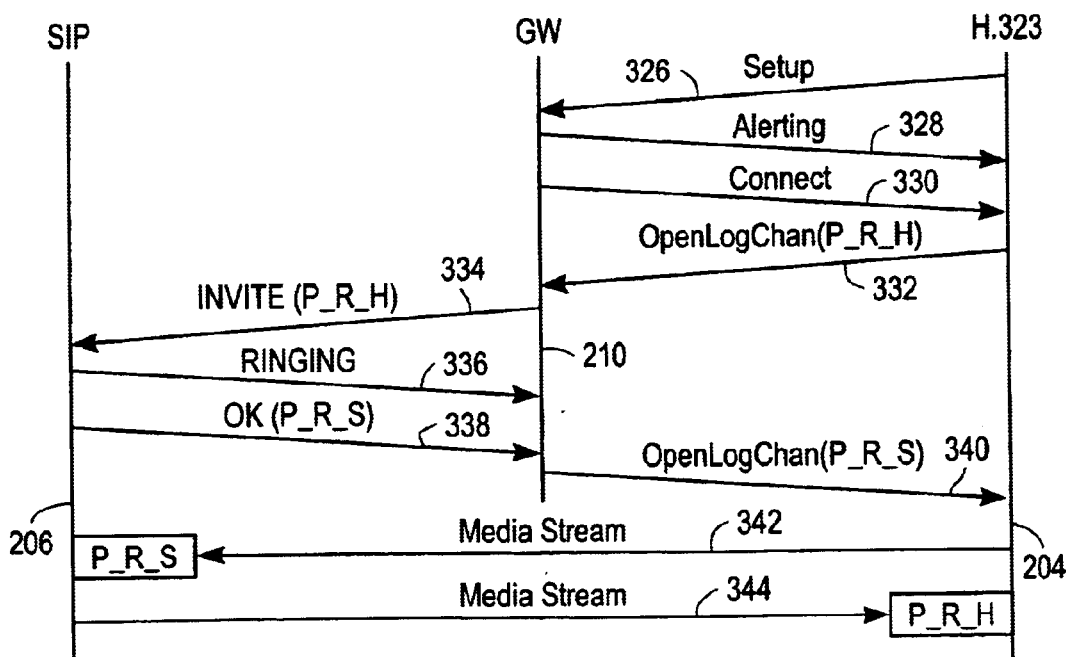
FIG. 7  A H.323 Endpoint calls a SIP Agent

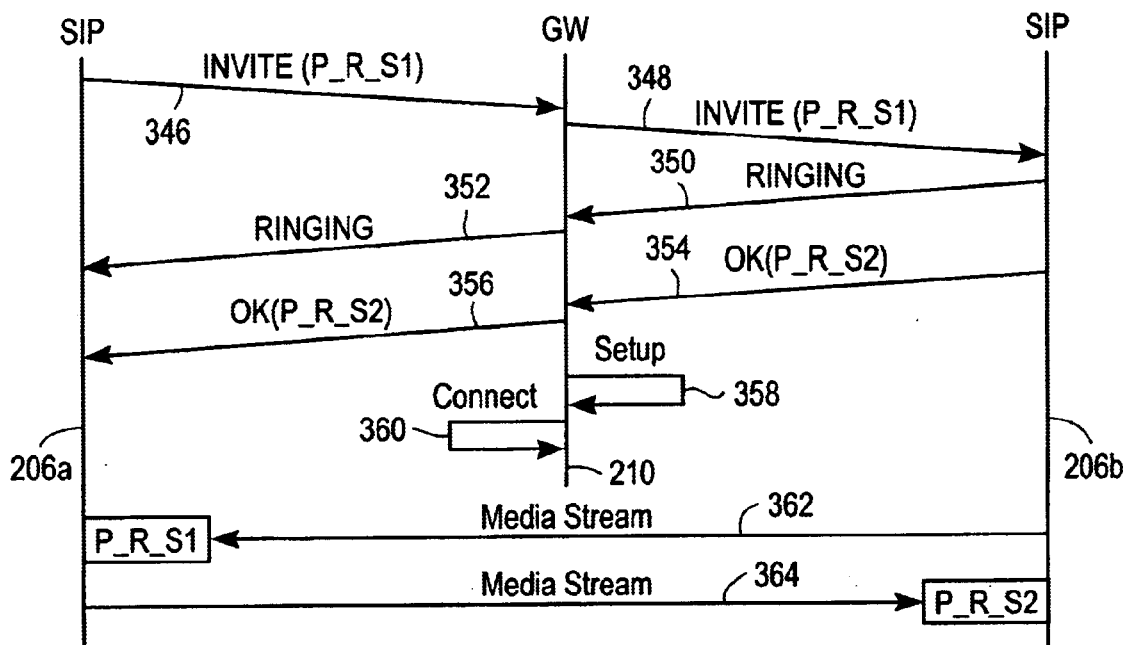
FIG. 8 A SIP Agent calls Another SIP Agent
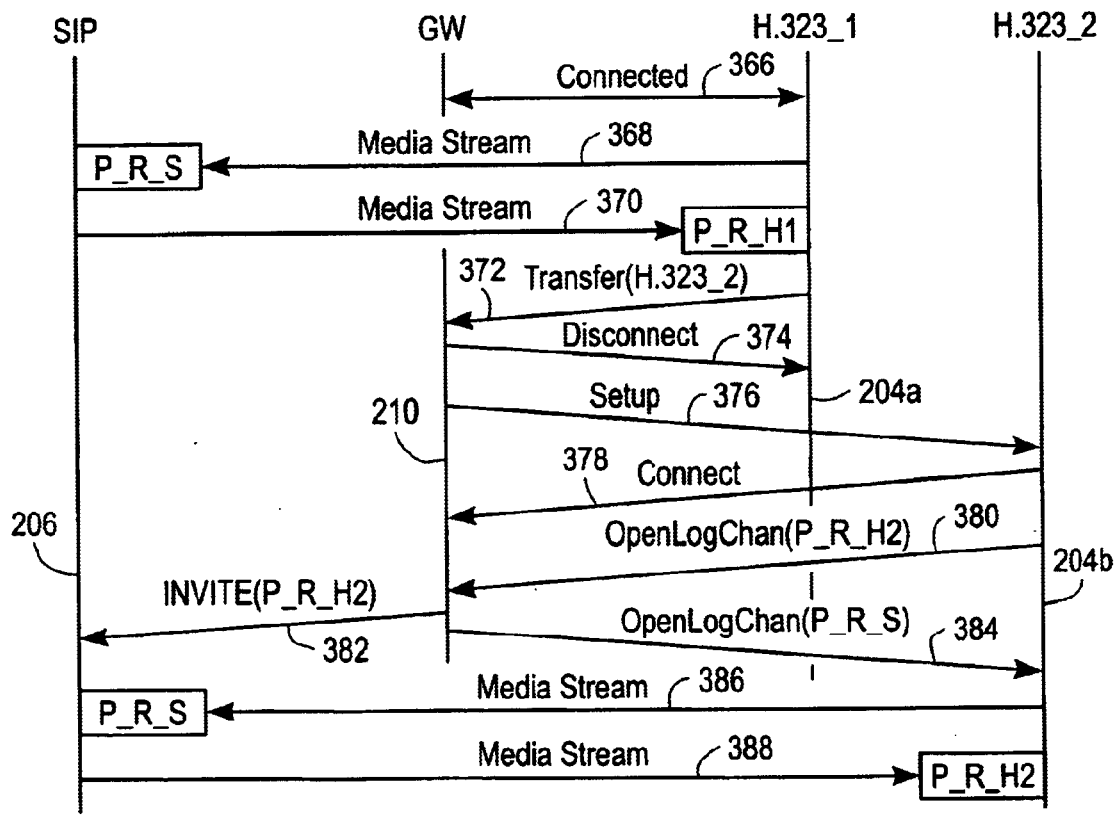
FIG. 9 Call Transfer from One H.323 Endpoint to Another H.323 Endpoint

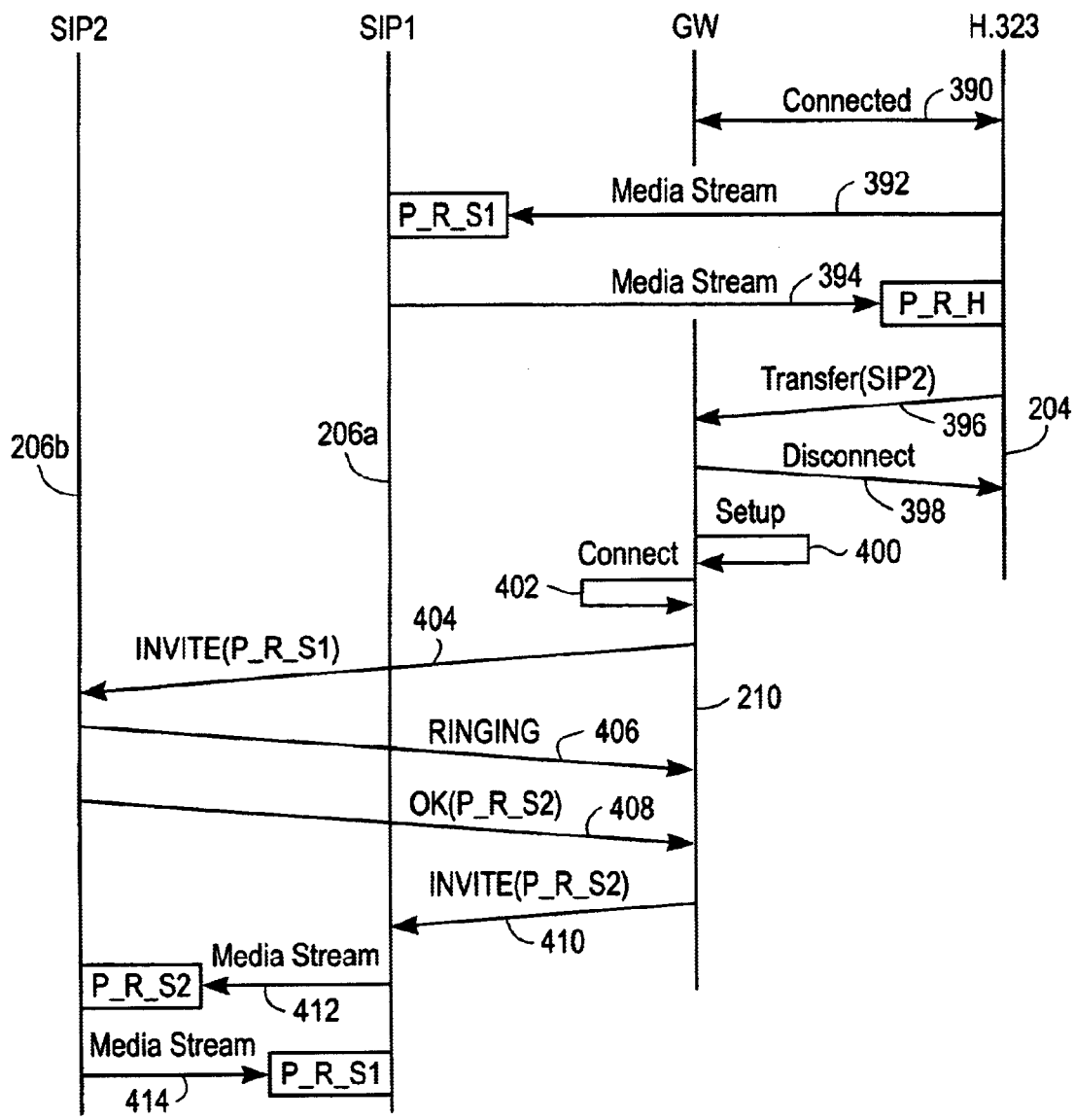
FIG. 10  Call Transfer from the H.323 Endpoint to Another SIP Agent

SIP-H.323 GATEWAY IMPLEMENTATION TO INTEGRATE SIP AGENTS INTO THE H.323 SYSTEM

BACKGROUND OF THE INVENTION

1. Field of the Invention

The present invention relates to telecommunications systems and, particularly, to a system and method for integrating Session Initiation Protocol (SIP) agents into an H.323 system.

2. Description of the Related Art

The International Telecommunications Union (ITU) Recommendation H.323 describes a set of devices and protocols for multimedia communication over packet-switched networks. The four main components defined by the specification are clients (also referred to as terminals or endpoints), multipoint control units, gateways (also referred to as an endpoint) and gatekeepers.

A diagram illustrating an exemplary H.323 telecommunications system 100 is shown in FIG. 1. The telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). The H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets.

The gatekeeper 108 is responsible for bandwidth management and address resolution. Each endpoint has a unique user ID or alias to represent an H.323 user. Each endpoint can have multiple aliases to represent multiple users. Each alias, before it can make or receive calls, must register with the gatekeeper 108. When an alias makes a call to another alias, the gatekeeper 108 verifies whether the called party is a valid alias and whether network bandwidth is available. If so, the gatekeeper 108 accepts the call request.

Typically, H.225.0 call signaling and H.245 call control signaling are routed through the gatekeeper 108, while the media channels (i.e., audio, data and/or video) are routed directly between the endpoints. For example, to place a call between two clients, the calling client sends a message to the gatekeeper 108, which resolves the address of the receiving party and sends the appropriate signaling messages to the caller and receiver. Once the signaling and control channels have been established, the endpoints establish the media channels. The media channel passes directly between the endpoints. The H.225.0 signaling channel and H.245 call control channel are also used to terminate the call.

While the H.323 Recommendation is a widely accepted standard for IP telephony, it is a very sophisticated protocol and it is relatively difficult to implement a simple IP telephone based on H.323. The Session Initiation Protocol (SIP) is an emerging application layer signaling protocol that is relatively easy to implement. Thus, it is desirable to integrate SIP protocol devices into an existing H.323 based system for simple IP phone implementation.

SUMMARY OF THE INVENTION

These disadvantages in the prior art are overcome in large part by a system and method according to the present invention. An SIP-H.323 gateway is provided, which functions as a multi-alias H.323 endpoint with one alias representing one SIP agent. The SIP-H.323 gateway processes the call signaling conversions and stores and passes media port information to the signaling parties, so that the existence of SIP agents is transparent to the H.323 endpoints and the features are transparently available to the H.323 endpoints.

A SIP-H.323 gateway according to the present invention includes a SIP protocol process engine, an H.323 stack, and also maintains a SIP alias table which has an alias for each SIP agent. In operation, the H.323 stack is initialized to include all the possible SIP agents as aliases and stores the SIP agent information in the SIP alias table. The SIP-H.323 gateway performs signaling conversion for any SIP agent whose information is stored in the table.

A better understanding of the invention is obtained when the following detailed description is considered in conjunction with the following drawings.

BRIEF DESCRIPTION OF THE DRAWINGS

FIG. 1 is a diagram of a prior art H.323 system;

FIG. 2 is a diagram of a SIP-H.323 system according to an implementation of the present invention;

FIG. 3 is a diagram of an SIP-H.323 gateway according to an implementation of the invention;

FIG. 4 is a diagram illustrating signal flow for gateway alias registration according to an implementation of the invention;

FIG. 5 is a diagram illustrating signal flow for SIP agent registration according to an implementation of the invention;

FIG. 6 is a diagram of signal flow for a SIP agent call to an H.323 endpoint according to an implementation of the invention;

FIG. 7 is a diagram of signal flow for an H.323 endpoint call to a SIP agent according to an implementation of the invention;

FIG. 8 is a diagram of signal flow for a SIP agent call to a SIP agent according to an implementation of the invention;

FIG. 9 is a diagram of signal flow for a call transfer from one H.323 endpoint to another H.323 endpoint according to an implementation of the invention;

FIG. 10 is a diagram of signal flow for a call transfer from one H.323 endpoint to another SIP agent according to an implementation of the invention.

DETAILED DESCRIPTION OF THE INVENTION

An exemplary system implementing combined SIP and H.323 functionality according to the present invention is shown in FIG. 2. As shown, the system includes a packet network 202, a gatekeeper 208, one or more H.323 client terminals 204a–204n, one or more SIP clients 206a–206n, and a SIP-H.323 gateway 210 according to the present invention.

The gatekeeper 208 implements an H.323 stack 209. The H.323 endpoints 204a–204n implement H.323 stacks 205a–205n as well as RTP/RTCP 207a–207n engines. The SIP agents 206a–206n implement SIP engines 209a–209n and RTP/RTCP 211a–211n engines. In a specific embodiment, each SIP engine 209 is identified by a SIP address 206a–206n of the form SIPx@hostx:port, where x identifies the specific host.

The SIP-H.323 gateway 210 includes both a SIP protocol engine 213 and an H.323 stack 215. As shown in FIG. 3, the SIP-H.323 gateway 210 maintains an alias table 301 which has an entry for each SIP agent. In operation, the SIP-H.323 gateway 210 is first configured to include all the SIP agents it represents. That is, the H.323 stack 215 is initialized to include all the possible SIP agents as its aliases and registers the aliases with the gatekeeper 208 (FIG. 2). After the SIP agent registers with the gateway 210, the information from the SIP agent is stored in the alias table 301. Thereafter, if a SIP agent that doesn't have an entry in the alias table 301 tries to register with the gateway 210, the registration will be rejected. If a SIP agent with an entry in the alias table 301 doesn't register with the gateway 210, it will not be able to receive calls because the gateway 210 will not know where the SIP agent is located.

When an H.323 endpoint 204a–204n calls a SIP agent 206a–206n by its alias, the gatekeeper 208 sends the call signaling to the SIP-H.323 gateway 210 since the SIP agent's alias is registered from the gateway 210. Thus, the gateway 210 makes a SIP call on behalf of the calling party to the SIP agent until both call legs are connected.

Because the gateway 210 is configured as a proxy server for the SIP agents 206a–206n, whenever a SIP agent 206a–206n makes a call by sending the SIP method INVITE message, the message will be sent to the gateway 210 first. If a SIP agent 206a–206n makes a call to an H.323 endpoint 204a–204n, the gateway 210 makes an H.323 call on behalf of the SIP agent to the H.323 endpoint 204a–204n until the two call legs are connected. If a SIP agent 206a–206n makes a call to another SIP agent 206a–206n, the gateway 210 makes a SIP call on behalf of the calling SIP agent 206a–206n to the called SIP agent 206a–206n until the two legs are connected. At the same time, the gateway 210 makes an H.323 call from the calling SIP agent alias to the called SIP agent alias, so that the gatekeeper 208 can maintain H.323 functionality transparently.

As noted above, each SIP agent 206a–206n has its corresponding alias configured in the gateway 210, so the total number of endpoints known to the gatekeeper 208 will be all the H.323 endpoints 204a–204n plus all the SIP agents 206a–206n. When an H.323 endpoint 204a–204n calls a SIP agent 206a–206n, a SIP agent 206a–206n calls an H.323 endpoint 204a–204n, or a SIP agent 206a–206n calls another SIP agent 206a–206n, the call signaling is handled and converted by the gateway. The RTP/RTCP port information, which is contained in the call signaling, of both sides is stored and passed by the gateway 210 to each side, so both sides can make the RTP/RTCP connections directly for media channels.

If, during a call connection between a SIP agent 206a–206n and an H.323 endpoint 204a–204n, the H.323 endpoint initiates a call transfer to another H.323 endpoint, the H.323 stack 215 of the gateway 210 disconnects the call to the transferring H.323 endpoint and make another call to the transferred-to H.323 endpoint. The SIP agent's RTP/RTCP port information is used by the gateway 210 to open a logical channel with the transferred-to H.323 endpoint. After the gateway 210 receives the RTP/RTCP port information of the transferred-to H.323 endpoint, the gateway 210 informs the SIP agent of this change for the existing session. The SIP agent then transfers the media channel to this new H.323 endpoint. A similar procedure occurs if the transfer is to another SIP agent.

Call signaling for system operation is described in greater detail with reference to FIGS. 4–10 below.

As noted above, the gateway 210 is configured to include all the SIP agents it represents by assigning one H.323 alias to each SIP agent. Thus, when the gateway 210 registers to the gatekeeper 208, all the SIP agent aliases will be registered to the gatekeeper 208. Thus, as shown in FIG. 4, the gateway 210 sends a registration request RRQ 300 to the gatekeeper. The registration request RRQ 300 includes all the SIP agent aliases. The gatekeeper 208 then responds with a registration acknowledge signal RCF 302.

Because the gateway 210 also performs as a SIP proxy server for all the SIP agents 206a–206n, a SIP agent 206a–206n has to register to the gateway 210 before it can make and receive calls. The gateway 210 keeps the information of the registered SIP agent in the SIP alias table 301. When the gateway 210 receives a call from an H.323 endpoint or a SIP agent, the gateway finds the location of the called SIP agent and makes a SIP call to that agent. Thus, as shown in FIG. 5, the SIP agent 206 registers by way of the REGISTER signal 304. The REGISTER signal 304 includes the SIP agent address. The gateway 210 responds with an acknowledge signal, OK 306.

FIG. 6 illustrates call signaling when a SIP agent calls an H.323 endpoint. As shown, a SIP agent 206 initiates a SIP call by sending the SIP method INVITE message 308 with the RTP/RTCP port information (P_R_S) to the gateway 210. Upon receiving this message, the gateway 210 first checks the destination to see if the destination is one of the SIP agent aliases it represents. If not, it starts its H.323 call to the destination (routed by the gatekeeper) by sending the H.323 setup message 310. The H.323 endpoint 204 responds with the H.245 alerting and connect messages 312, 314, in between which the gateway 210 causes ringing 313 at the SIP agent.

Next, the gateway 210 is notified with the RTP/RTCP port information (P_R_H) of the H.323 endpoint 204 via the OpenLogChan(P_R_H) signal 316. In turn, the gateway 210 sends the Response OK message 318 with the RTP/RTCP port information (P_R_H) to the SIP agent 206 and also sends the SIP agent RTP/RTCP port information to the H.323 endpoint via the OpenLogChan(P_R_S) signal 320. The SIP agent 206 and the H.323 endpoint 204 can then talk directly by sending media streams 322, 324 to the RTP ports of the other side.

FIG. 7 illustrates the signaling for a call from an H.323 endpoint to a SIP agent. As shown, when an H.323 endpoint 204 wants to make a call to a SIP agent 206, the call setup message SETUP 326 will be routed by the gatekeeper to the gateway 210, because the gateway 210 represents the SIP agent alias. If the SIP agent 206 has already registered to the gateway 210, the gateway 210 will try to complete the call connection first, through which the RTP/RTCP port information (P_R_H) on the H.323 endpoint side will be available to the gateway. That is, the gateway 210 responds to the SETUP message 326 with H.245 alerting and connect messages 328, 330, after which the H.323 endpoint provides the RTP/RTCP port information, in the OpenLogChan(P_R_H) signal 332. With this information, the gateway 210 initiates a SIP call to the SIP agent 206 by sending the SIP method INVITE message 334 with the H.323 endpoint's RTP/RTCP port information (P_R_H). The SIP agent 206 sends ringing 336 and answers the call by sending the Response OK message 338 with its RTP/RTCP port information (P_R_S) to the gateway 210. The gateway 210 opens the outgoing logic channel to the H323 endpoint with the SIP agent's RTP/RTCP port information P_R_S (via OpenLogChan(P_R_S) 340). The H.323 endpoint 204 and the SIP agent 206 then talk directly by sending media streams 342, 344 to the RTP ports of the other side.

FIG. 8 illustrates the signaling for a call between two SIP agents. As shown, a SIP agent 206a initiates a SIP call by sending the SIP Method INVITE message 346 with the RTP/RTCP port information (P_R_S1) to the gateway 210. Upon receiving this message, the gateway 210 will check to see if the destination is one of the SIP agent aliases it represents. If so, and the SIP agent 206b has already registered to the gateway 210, the gateway 210 makes another SIP call INVITE (P_R_S1) 348 to the destination and passes the RTP/RTCP port information (P_R_S1) of the calling SIP agent.

The called SIP agent 206b sends ringing 350 and answers the call with the OK (P_R_S2) signal 354, which includes its RTP/RTCP port information. The gateway 210 passes the ringing 352 and the OK (P_R_S2) signal with the RTP/RTCP port information (P_R_S2) of the called SIP agent 206b back to the calling SIP agent 206a with the OK signal 356.

The two SIP agents 206a, 206b talk directly by sending the media streams 362, 364 to the RTP ports of the other side. Concurrently, the gateway 210 makes an H.323 call (i.e., the SETUP 358 and CONNECT 360 messages) from the calling SIP agent alias to the called SIP agent alias. In this way, the gatekeeper 208 maintains all the call activities in its domain.

FIG. 9 illustrates call signaling for transfer of a call with a SIP agent 206 from one H.323 endpoint 204a to another H.323 endpoint 204b. Initially, the gateway 210 and the H.323 endpoint 204a maintain a signaling connection 366, while the SIP agent 206 and the H.323 endpoint 204a send media streams 368, 370 directly to each other's RTP/RTCP ports P_R_S, P_R_H1, respectively. As shown, the H.323 endpoint 204a initiates a call transfer to the H.323 endpoint 204b via the Transfer (H.323_2) signal 372, which identifies the transfer-to endpoint. Because H.323 call signaling is connected between the H.323 endpoint 204a and the gateway 210, the gateway 210 will disconnect the existing call via the DISCONNECT signal 374 and make a new call to the H.323 endpoint 204b, using the SETUP command 376. The H.323 endpoint 204b responds with the H.245 connect signal 378 and OpenLogChan (P_R_H2) 380 to open the logical channel. At this time, the gateway 210 receives the RTP/RTCP port information from the H.323 endpoint 204b, which is stored locally for the originally connected SIP agent. After the gateway 210 receives the RTP/RTCP port information for the new H.323 endpoint 204b, the gateway 210 changes the existing session with the SIP agent 206 by sending another SIP method INVITE message 382 with the new media information. Further, the gateway 210 provides the SIP agent's RTP/RTCP port information to the H.323 endpoint 204b using the OpenLogChan(P_R_S) signal 384. Thereafter, the SIP agent 206 and the H.323 endpoint 204b can send media streams 386, 388 directly to the RTP ports of the other side.

FIG. 10 illustrates signaling for a call transfer from one H.323 endpoint to another SIP agent. As shown, the H.323 endpoint 204 is connected via a logical channel 390 to the gateway 210, with media channels 392, 394 directly to SIP agent 204a. The H.323 endpoint 204 initiates a call transfer to another SIP agent 206b using the TRANSFER signal 396. Because H.323 call signaling is connected between the H.323 endpoint 204 and the gateway 210, the gateway stack disconnects the existing call using the disconnect signal 398. The gateway 210 will then make a new call to the alias SIP2 using the H.323 call SETUP and CONNECT signals 400, 402. The gateway 210 will make another SIP call to the new SIP agent 206b using the SIP INVITE command 404. The RTP/RTCP port information of the originally connected SIP agent 206a is provided to the SIP agent 206b at this time.

The SIP agent 206b sends ringing 406. After the call is answered by the SIP agent 206b, the SIP agent 206b provides its RTP/RTCP port information via the OK(P_R_S2) command 408. The gateway 210 changes the existing session with the SIP agent 206a by sending another SIP method INVITE message 410 to the SIP agent 206a with the new media information. The SIP agents 206a, 206b can then send media streams 412, 414 directly to the new RTP ports of the other side. It is noted that while described in the context of call transfer, similar procedures may be applied to other H.323 features, such as forwarding, call hold, message waiting, and the like. Thus, the figures are exemplary only.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   a local area network;
   at least one H.323 client endpoint coupled to said local area network;
   at least one Session Initiation Protocol (SIP) agent coupled to said local area network; and
   a gateway coupled to said local area network, said gateway including a SIP agent alias table for storing H.323 aliases for said at least one SIP agent, wherein said gateway is adapted to perform signaling conversion between said at least one H.323 client endpoint and said at least one SIP agent, such that said at least one H.323 endpoint and said at least one SIP agent can communicate over said local area network.

2. A telecommunications system according to claim 1, further including a gatekeeper for routing calls to said gateway.

3. A telecommunications system according to claim 2, wherein a call to a SIP agent is processed via said gateway.

4. A telecommunications system according to claim 3, wherein said call to a SIP agent is made to an H.323 alias corresponding to said SIP agent.

5. A telecommunications system according to claim 2, wherein a call by a SIP agent is processed via said gateway.

6. A telecommunications system according to claim 5, wherein said call by said SIP agent comprises a SIP INVITE message to said gateway.

7. A telecommunications system according to claim 6, wherein said call by said SIP agent includes an H.323 call from said SIP agent's H.323 alias to a called SIP agent's H.323 alias.

8. A telecommunications system according to claim 7, wherein said call by said SIP agent includes an H.323 call from said gateway to a called SIP agent.

9. A telecommunications system according to claim 7, wherein said call by said SIP agent includes an INVITE message from said SIP agent to a called SIP agent.

10. A telecommunications system according to claim 9, wherein said call by said SIP agent includes an INVITE message from said gateway to a called SIP agent.

11. A telecommunications gateway for use in a local area network, the local area network including one or more SIP agents and one or more H.323 endpoints, comprising:
    an H.323 stack;
    a Session Initiation Protocol (SIP) engine; and
    a SIP agent alias table;
    wherein signaling conversion is performed for SIP agents whose aliases are stored in said SIP agent alias table such that said SIP agents can communicate with said one or more H.323 endpoints one said local area network.

12. A telecommunications gateway in accordance with claim 11, wherein said aliases are H.323 aliases.

13. A telecommunications gateway according to claim 12, wherein a call to a SIP agent is made to an H.323 alias stored in said SIP agent alias table corresponding to said SIP agent.

14. A telecommunications gateway according to claim 13, wherein a call by a SIP agent comprises a SIP INVITE message to said gateway.

15. A telecommunications gateway according to claim 14, wherein said call by said SIP agent includes an H.323 call from said gateway to a called SIP agent.

16. A telecommunications method, comprising:
   storing H.323 aliases for at least one SIP agent in a gateway, said gateway and said SIP agent coupled to a local area network; and
   using said stored H.323 aliases to perform signaling conversion between at least one H.323 client endpoint coupled to said local area network and said at least one SIP agent.

17. A telecommunications method according to claim 16, including making a call to a SIP agent by calling an H.323 alias corresponding to said SIP agent.

18. A telecommunications method according to claim 17, wherein making a call by a SIP agent comprises a SIP INVITE message to said gateway.

19. A telecommunications method according to claim 18, wherein said making said call by said SIP agent includes making an H.323 call from said SIP agent's H.323 alias to a called SIP agent's H.323 alias.

20. A telecommunications method according to claim 19, wherein said making said call by said SIP agent includes making an H.323 call from said gateway to a called SIP agent.

21. A telecommunications method according to claim 20, wherein said making said call by said SIP agent includes sending an INVITE message from said gateway to a called SIP agent.

22. A telecommunications system, comprising:
   a local area network;
   at least one H.323 client terminal coupled to said local area network;
   at least one Session Initiation Protocol (SIP) agent coupled to said local area network; and
   a gateway coupled to said local area network, the gateway including a SIP agent alias table for storing H.323 aliases for said at least one SIP agent, wherein gateway is adapted to perform signaling conversion between H.323 features and SIP features such that said at least one H.323 terminal and said at least one SIP agent can communicate over said local area network.

* * * * *